US007153456B2

(12) United States Patent
Wilson

(10) Patent No.: US 7,153,456 B2
(45) Date of Patent: Dec. 26, 2006

(54) METHOD OF MAKING MOLDS FOR MAKING ARTICLES AND A METHOD OF MOLDING ARTICLES USING SUCH MOLDS

(75) Inventor: Priscilla Ann Wilson, Sautee, GA (US)

(73) Assignee: GourdCraft Originals, Inc., Sautee, GA (US)

( * ) Notice: Subject to any disclaimer, the term of this patent is extended or adjusted under 35 U.S.C. 154(b) by 15 days.

(21) Appl. No.: 10/133,175

(22) Filed: Apr. 26, 2002

(65) Prior Publication Data

US 2002/0171166 A1  Nov. 21, 2002

Related U.S. Application Data

(60) Provisional application No. 60/287,064, filed on Apr. 28, 2001.

(51) Int. Cl.
 *B29C 33/38* (2006.01)
(52) U.S. Cl. ............ 264/39; 219/121.67; 249/55; 264/152; 264/220; 264/221; 264/225; 264/227; 264/317
(58) Field of Classification Search ............... 249/55; 264/219, 221, 338, 317, 39, 152, 220, 225, 264/227; 219/121.67
See application file for complete search history.

(56) References Cited

U.S. PATENT DOCUMENTS 1,373,121 A * 3/1921 Emery ................. 264/311

| | | | | |
|---|---|---|---|---|
| 4,053,650 A * | 10/1977 | Chino et al. | ................. | 426/304 |
| 4,827,666 A * | 5/1989 | Tweddell, III | ........... | 47/58.1 R |
| 4,836,969 A * | 6/1989 | Colin et al. | ................. | 264/311 |
| 5,858,485 A * | 1/1999 | Chou et al. | ................... | 428/21 |
| 6,497,046 B1 * | 12/2002 | Bardeen et al. | ................ | 30/517 |
| 6,513,454 B1 * | 2/2003 | Snyder | ........................ | 119/428 |
| 6,546,654 B1 * | 4/2003 | Henson | ........................ | 40/610 |

OTHER PUBLICATIONS

Posting of HerHobbies.com (Mar. 31, 2001), pp. 1-4.*
Martha Stewart, "Harvest Thanksgiving Table Accents" (Nov. 1999), New York Times Syndicate (3 pages).*
Stewart, Martha, "Thanksgiving Table Accents" (Nov. 13, 1999) The Arizona Republic.*

* cited by examiner

*Primary Examiner*—Allan R. Kuhns
(74) *Attorney, Agent, or Firm*—Womble Carlyle Sandridge & Rice

(57) ABSTRACT

A process is described for making gourd molds useful in the production of decorative ceramic and other articles which bear the textures of the gourd interior. Articles produced may also serve as models for use in the manufacture of production molds. Steps in making the gourd molds include selection, cutting, and removal of pulp; steps in using the gourd molds include treating with a release agent, casting, and removal of the gourd mold from the molded article.

10 Claims, 1 Drawing Sheet

METHOD OF MAKING MOLDS FOR MAKING ARTICLES AND A METHOD OF MOLDING ARTICLES USING SUCH MOLDS

CROSS-REFERENCE TO RELATED APPLICATIONS

This application claims the benefit of Provisional Application 60/287,064, filed Apr. 28, 2001.

STATEMENT REGARDING FEDERALLY SPONSORED RESEARCH OR DEVELOPMENT

NOT APPLICABLE

REFERENCE TO A MICROFICHE APPENDIX

NOT APPLICABLE

BACKGROUND OF THE INVENTION

The art of making molds with which to produce ceramic articles has been known since ancient times. One method of making such molds which has been used since ancient times is to form the mold-making material, traditionally plaster, around a natural object such as a fruit or vegetable. Such methods utilize the outside surface of the natural object to form the inside surface of the mold and thus the product made from the mold has the shape of the original object. In contrast thereto, the present invention utilizes the veined and textured inside surface of a naturally occurring hollow object commonly known as a gourd either as the mold face, or to form the mold face. Thus the outside surfaces of the present products have the texture as well as the shape of the inside of such naturally occurring object.

A second field of the present invention is gourd artistry, which has also been known since ancient times. The woody fruits commonly known as gourds have been used in most parts of the world as food and water containers, musical instruments, floats, and to fill countless other human needs; in some cultures the decoration of gourds remains a respected and elaborate art form. However, there is no evidence whatsoever of gourds having been used as molds to produce objects from other materials such as clay; thus the present invention represents a new and unobvious use for a naturally-occurring thing.

BRIEF SUMMARY OF THE INVENTION

The present invention relates to a method of making unique gourd molds suited to the production of ceramic and other articles and most practically to the production of models useful in making traditional production molds for ceramic and other arts, and to a method of making articles using such molds. The articles produced by the present molds have an organic appearance, the veins and textures looking somewhat like plant fossils. Each gourd mold embodies patterns which are unique in the way that a human fingerprint is unique. Thus the textures and shapes produced by the present invention are unique, random, and substantially infinite.

Accordingly, several objects and advantages of the invention are: to provide a novel method for forming aesthetically pleasing shapes and textures in ceramics; to provide a new method for capturing textures from nature which would be impossible for a human being to create; to provide a new method for capturing shapes from nature; and to provide a product which people may use in their everyday lives which connects them with the natural world and in particular with gourds, which were provided by nature as the original dishes and containers used by humans.

DETAILED DESCRIPTION OF THE INVENTION

The Gourd Mold

Figure 1:
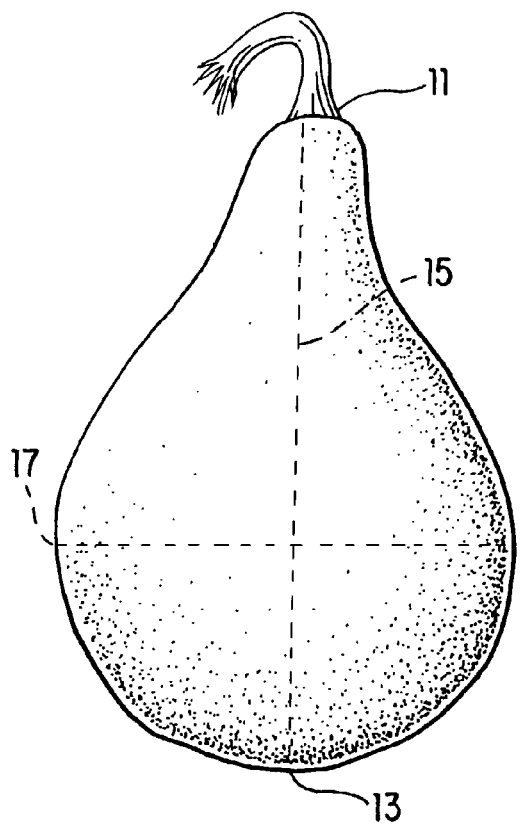
FIG. 1 is a perspective drawing showing an example of a dry, uncut gourd which is ready to be made into a mold. Lines 15 and 17 represent two examples of ways in which the gourd may be cut at the widest points vertically or horizontally depending upon the intended product to be molded.
Figure 2:
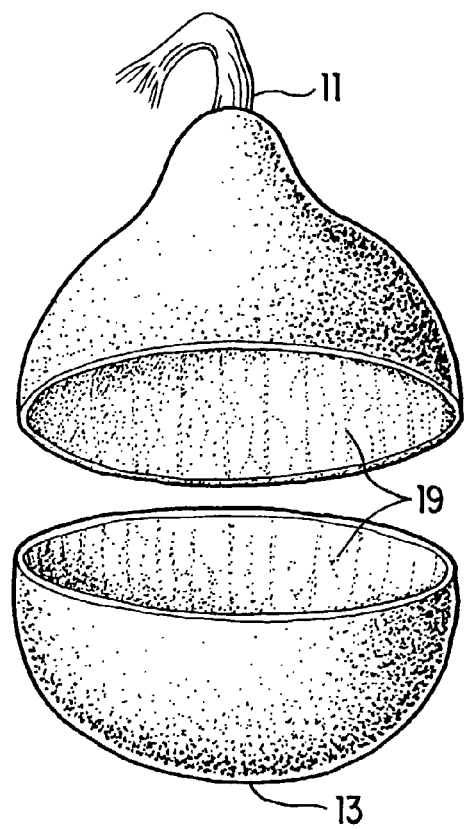
FIG. 2 is a perspective drawing showing the same gourd which has been cut along line 17, and cleaned revealing the veins and textures 19.

The naturally occurring products most useful in the present invention are fruits of the gourd family, an example of which is shown in FIG. 1. In general, these fruits are woody and basically hollow when dried, having shells from about ⅛ inch to about ½ inch thick. They grow in an infinite variety of sizes, up to about 20 inches in diameter. The shapes vary widely as well and include forms unique to gourds as well as shapes mimicking many other fruits such as squash, grapefruit, or pears.

Eminently useful in the present invention are the *lagenaria*, or hard-shell gourd and the *cucurbita*, or ornamental gourd. While the outside of the useful fruit is relatively hard, the inside of the dried gourd is softer, more porous and textured with veins. These organic markings and the fact that the gourd is a porous natural container make it uniquely suited to use as a mold for the creation of objects or, more pragmatically, for the creation of models with which to create traditional molds.

Initially the dried gourd is selected for the size and shape of the object to be made. For example, to mold a cup, the gourd selected might have roughly a round circumference with the diameter ranging from four inches to six inches. If the finished object is to be a bowl, the gourd that is selected has a larger circumference and may suitably be roughly round, oval or of various natural shapes. If the finished object is to be a vase, the choice of gourd size and shape is an aesthetic one.

Figure 3:
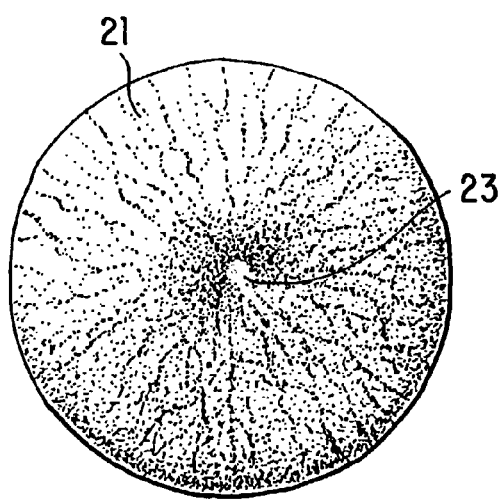
FIG. 3 is a perspective drawing showing a clay bowl which has been molded in the bottom part of the gourd mold shown in FIG. 2. The textures 21 are impressions of the gourd mold face. The indentation 23 has resulted from a natural convex curve at the blossom end 13 of the gourd mold.
Figure 4:
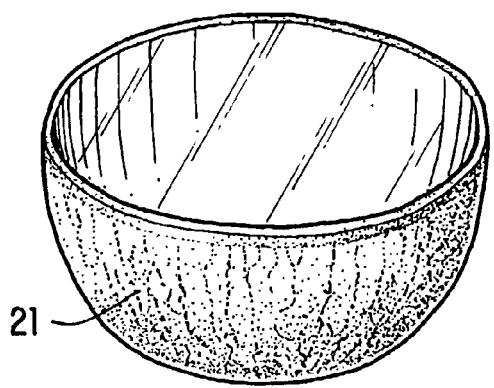
FIG. 4 is an additional perspective drawing of the bowl shown in FIG. 3.

The gourd may then be cut using a keyhole saw, jig saw, sabre saw, band saw, or laser to provide access to the inside of the gourd for the removal of the seeds and pulp. The inventor's preferred tools are a miniature electric jig saw and a standard electric jig saw, the latter of which is commonly used for woodworking. If a simple shape, i.e., one which can be produced with a one-part mold, is desired, the initial cut to access cleaning may be made with the standard jig saw, which cuts fast but removes more of the shell than the miniature jig saw. The cut should be made around the circumference of the gourd along the widest part of the circumference 17 to facilitate removal of the seeds and pulp and later the removal of the finished molded item shown in FIGS. 3 and 4. To produce items such as cups or bowls, the gourd is typically cut horizontally, i.e., along a line running roughly perpendicular to the axis of the gourd connecting the stem end 11 to the blossom end 13.

To produce articles such as vases which have more complex shapes and will require production molds of two or more pieces, the gourd may be cut in various ways as the shape dictates for cleaning purposes and then glued back together after cleaning. Most commonly the gourd is cut vertically along a line 15 from stem end 11 to blossom end 13 of the gourd. Cutting for these items is done with a miniature jig saw so that a minimum amount of the gourd shell is lost, thus allowing the gourd to be reconstructed after cleaning.

The initial step in the removal of the seeds and dried pulp is suitably done manually. After such manual removal the inside of the gourd will usually have portions of pulp clinging to the inside surface of the gourd. To remove such remaining material without damaging the natural markings or internal shape of the gourd, two preferred methods are used depending upon the nature of the pulp in a particular gourd: 1) water pressure from a garden hose or a pressure washer and 2) a fine wire brush attached to a flexible shaft and powered by an electric motor but applied manually in a delicate manner. The process of preparing the inside of the gourd may also be performed with air pressure, or by chemical means, provided that the inside markings and internal shape of the gourd are not damaged or destroyed. If the gourd has been cleaned with water pressure, it is air-dried for a period of two to three days before it is used as a mold.

In the case of a two-or-more-part gourd mold, the parts of the gourd are glued back together after cleaning with the use of wood glue as both glue and caulk such that there are no cracks or leaks in the finished gourd mold. The parts of the mold are held together while the glue sets with strong tape, flexible clamps, or wide rubber bands such as are typically used to hold plaster molds together. After the gourd mold has been glued back together and the glue allowed to dry, a hole is then cut in the desired place for pouring the casting material into the gourd.

The Molding

In the process of producing molded articles according to the present invention, the internal surfaces of the dried gourd are typically pre-treated with known external mold release agents, or mixtures thereof, depending upon the choice of material with which the mold will be cast. For example, the mold surface, or surfaces, may be treated with conventional external mold release agents such as talc, soaps, waxes, or any of a number of commercially manufactured mixtures available.

The preferred release agent when the gourd mold is to be cast with clay slip, which is the inventor's preferred base material, is a mixture of talc and fine sand. The mixture is poured liberally into the gourd and moved around inside the gourd so that the mixture goes into all crevices and indentations; then the remaining mixture is poured back out of the gourd.

The base casting materials useful in the present invention are those which will readily conform to the internal shape and texture of the gourd. Those useful include: clays, plasters, rubbers, plastics, resins, silicones or waxes. Using these various materials to make models of the inside of the gourd mold, such models may then be used to create molds from various materials for the production of clay, cement, wax, metal, resin, or other articles using this invention. The molding process may in these cases be appropriately selected from the prior art methods, depending on the base material that is utilized. If the preferred material is clay, the molded article may be produced by a press molding process as well as a slip-casting process.

As stated, the inventor's preferred base material is clay slip or slurry. Such preference is a function of resources readily available to the inventor and the relative ease with which a plaster production mold may be made from a moist clay model. The slurry may be made or bought commercially. After the release agent has been applied to the inside of the gourd, a known process of slip-casting is used, the only difference between the present invention and the prior art of slip-casting in plaster molds being that the slip must remain in the gourd for a period of three to eight hours rather than the 20–40 minutes required for casting in a plaster mold. This long casting time is necessary to obtain a clay vessel wall which is thick enough to survive the shrinkage and release process and thick enough for use as a sturdy model for making a plaster mold.

The De-molding

After the base material has been cast in the mold the material is allowed to dry slowly over a period of from two to ten days. During this drying period the formed article is released from the mold face and may be removed from the gourd mold. If the gourd mold has both convex and concave surfaces as in FIG. 1, the mold must be burned away or cut from the formed article, the latter being the preferred method. Suitably this is carefully done along line 17 or line 15 using a miniature cutting wheel on a high speed drill. The preferred tool has a diameter of about ½ inch so that the cut is about 3/16 inch deep, allowing the cut to be made without damaging the formed article. Typically when a clay base material is used, the article has shrunk enough to leave an air space of about ⅛ inch between the gourd mold inner surface and the surface of the formed article.

When plaster, rubber, or other model-making material has been used, shrinkage typically will not have taken place during the curing process. Thus the gourd shell must not be cut all the way through, which would damage the model, but must be deeply scored to allow the gourd to be carefully broken apart by hand. The scoring may be done with any of a variety of commercially available routing or carving bits on a high-speed drill.

While the present invention has been described herein with reference to certain examples and preferred embodiments, it is to be understood that various changes and modifications may be made by those skilled in the art without departing from the concept of the invention, the scope of which is to be determined by reference to the following claims.

I claim:

1. A method of making a mold for making ceramic articles that have an exterior surface that is an impression of the inside surface of a gourd, said method comprising the steps of:

(a) selecting a dried hard-shell gourd that is substantially hollow with an inside surface that is porous and textured with veins;

(b) cutting the gourd open to provide access to the inside of the gourd;

(c) substantially completely removing seeds, pulp, and filament material from the inside of the gourd in a manner that leaves the porous and textured inside surface and internal shape of the gourd undamaged;

(d) casting the inside of the gourd with a base casting material that conforms to the internal shape and inside surface texture of the gourd;

(e) allowing the base casting material to dry inside the gourd for a predetermined length of time to form a model having an exterior surface that is an impression of the inside surface of the gourd;

(f) removing the model from the gourd without damaging the model; and (g) using the model to make a mold for making ceramic articles.

2. A method of making a mold as claimed in claim 1 and wherein step (b) comprises cutting the gourd open using a tool selected from the group consisting of a keyhole saw, a jig saw, a saber saw, a band saw, and a laser.

3. A method of making a mold as claimed in claim 1 and wherein step (c) comprises removing seeds, pulp, and filament material from the inside of the gourd using a tool selected from the group consisting of water pressure, a wire brush, air pressure, and a chemical.

4. A method of making a mold as claimed in claim 1 and where in step (a) the gourd is selected from the group consisting of the species *lagenaria* and the species *cucurbita*.

5. A method of making a mold as claimed in claim 1 and where in step (d) the base casting material is clay slip and wherein casting the inside of the gourd comprises slip casting the inside of the gourd with the clay slip for a period of from three to eight hours before removing excess clay slip thereby forming inside the gourd a clay slip vessel having a predetermined wall thickness.

6. A method of making a mold as claimed in claim 5 and wherein step (e) comprises allowing the clay slip to dry inside the gourd for a period of from two to ten days to cause the model to experience shrinkage and thereby to be released from the inside surface of the gourd.

7. A method of making a mold as claimed in claim 1 and where in step (d) the base casting material is selected from the group consisting of clays, plasters, rubbers, plastics, resins, silicones, and waxes.

8. A method of making a mold as claimed in claim 1 and wherein step (f) comprises cutting the gourd from the model.

9. A method of making a mold as claimed in claim 8 and wherein step (f) further comprises scoring the gourd and breaking the scored gourd apart by hand.

10. A method of making a mold as claimed in claim 1 and further comprising the step of gluing the cut-open gourd back together following step (c) and cutting a hole at a predetermined location in the gourd in preparation for step (d).

* * * * *